(12) United States Patent
Lee et al.

(10) Patent No.: US 7,016,916 B1
(45) Date of Patent: Mar. 21, 2006

(54) METHOD OF SEARCHING MULTIMEDIA DATA

(75) Inventors: Jin Soo Lee, Seoul (KR); Hyeon Jun Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 748 days.

(21) Appl. No.: 09/495,250

(22) Filed: Jan. 31, 2000

(30) Foreign Application Priority Data

Feb. 1, 1999 (KR) ..................................... 99-3182
Feb. 1, 1999 (KR) ..................................... 99-3183

(51) Int. Cl.
G06F 17/00 (2006.01)

(52) U.S. Cl. ...................... 707/103; 707/101; 707/102; 707/104.1

(58) Field of Classification Search .................... 707/3, 707/1, 2, 100, 101, 102, 103, 104.1; 382/100, 382/107, 200, 218, 219, 220
See application file for complete search history.

(56) References Cited

U.S. PATENT DOCUMENTS

| | | | |
|---|---|---|---|
| 5,020,019 A | 5/1991 | Ogawa | 707/5 |
| 5,297,042 A | 3/1994 | Morita | 707/5 |
| 5,321,833 A | 6/1994 | Chang et al. | 707/5 |
| 5,579,471 A | 11/1996 | Barber et al. | 382/209 |
| 5,619,347 A * | 4/1997 | Taniguchi et al. | 358/516 |
| 5,724,567 A | 3/1998 | Rose et al. | 707/2 |
| 5,751,286 A * | 5/1998 | Barber et al. | 382/220 |
| 5,793,888 A | 8/1998 | Delanoy | 382/219 |
| 5,802,361 A | 9/1998 | Wang et al. | 382/217 |
| 5,893,095 A * | 4/1999 | Jain et al. | 707/6 |
| 5,982,931 A * | 11/1999 | Ishimaru | 382/218 |
| 6,041,140 A * | 3/2000 | Binns et al. | 382/209 |
| 6,081,276 A * | 6/2000 | Delp | 345/431 |
| 6,128,398 A * | 10/2000 | Kuperstein et al. | 382/118 |
| 6,163,622 A * | 12/2000 | Abdel-Mottaleb et al. | 382/170 |
| 6,285,995 B1 * | 9/2001 | Abdel-Mottaleb et al. | 707/3 |
| 6,445,834 B1 * | 9/2002 | Rising, III | 382/305 |

FOREIGN PATENT DOCUMENTS

| | | |
|---|---|---|
| JP | 04-320665 | 6/1994 |
| JP | 05-145289 | 1/1995 |
| JP | 05-309135 | 6/1995 |
| JP | 06-028059 | 9/1995 |
| JP | 07-055935 | 9/1996 |
| JP | 07-055937 | 9/1996 |
| JP | 07-260148 | 4/1997 |
| JP | 08-313615 | 6/1998 |
| JP | 08-330813 | 6/1998 |
| JP | 09-066833 | 9/1998 |
| JP | 09-095840 | 10/1998 |
| JP | 09-136816 | 12/1998 |
| JP | 09-163033 | 1/1999 |

* cited by examiner

Primary Examiner—Isaac Woo
(74) Attorney, Agent, or Firm—Fleshner & Kim, LLP

(57) ABSTRACT

A method of searching multimedia data is disclosed in which a search for an image can re-performed by automatically updating weights of features and/or weights of feature elements in the respective feature in an image.

16 Claims, 10 Drawing Sheets

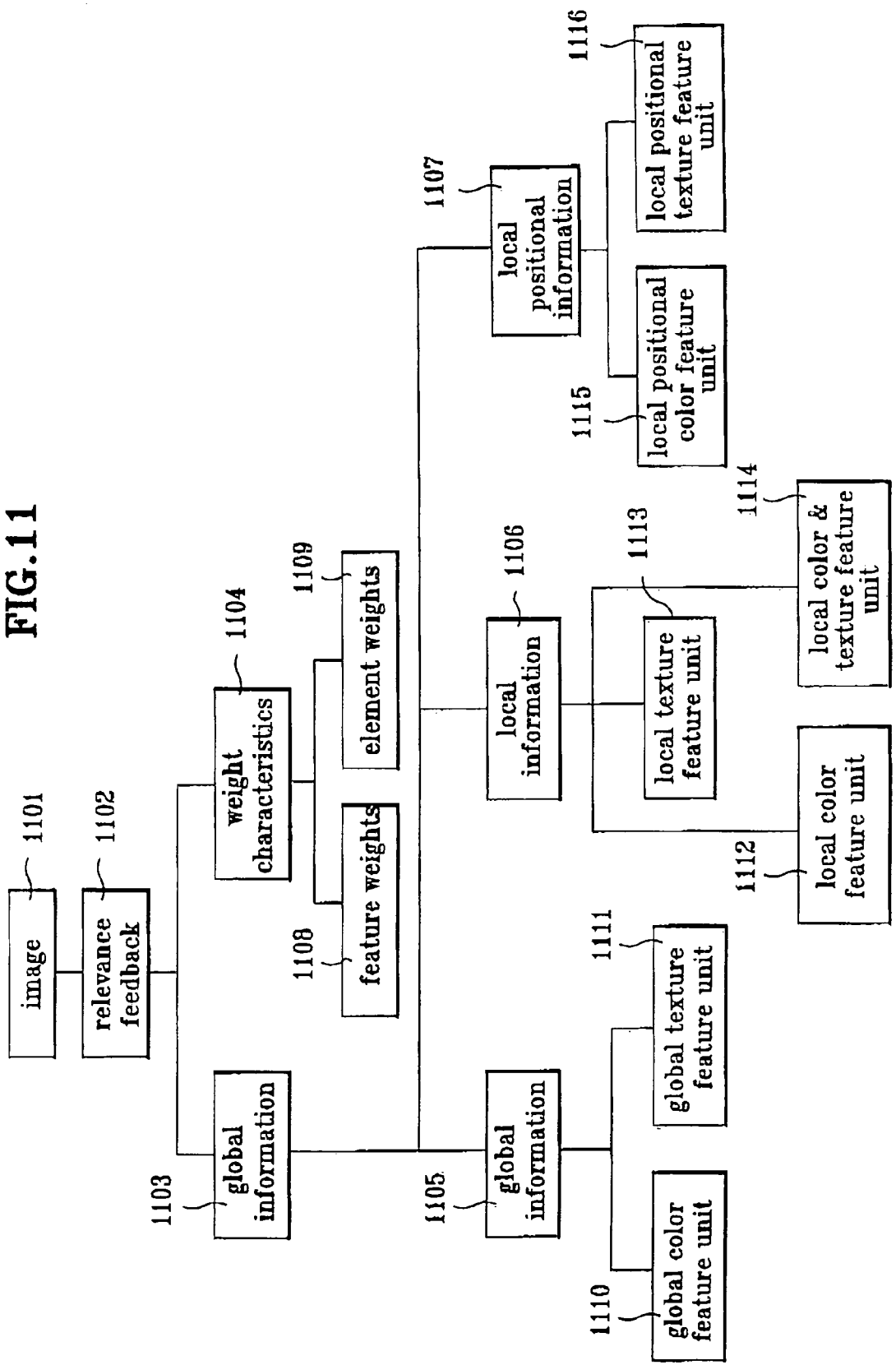

METHOD OF SEARCHING MULTIMEDIA DATA

BACKGROUND OF THE INVENTION

1. Field of the Invention

The present invention relates to a method of searching multimedia data, and more particularly to a method of searching multimedia data more accurately by utilizing user feedback.

2. Background of the Related Art

Recently, technology for digital image signal processing has been greatly developed and has been applied in various fields. For example, the digital image signal processing technology may be used in a search system for automatically editing only the face of a specific character in a moving picture file of a movie or drama, in a security system for permitting access to only persons registered in the system, or in a search system for searching a particular data from an image or video detected by a detection system. The performance of such systems basically depend on the accuracy and speed of detecting or searching the desired object. Accordingly, various image searching methods have been proposed in the related art.

An image search system which detects a degree of similarity with an image to be searched utilizing features such as color, texture or shape is disclosed in U.S. Pat. No. 5,579,471 entitled "An image query system and method." Depending upon the image to be searched, the importance of a feature may vary and within one particular feature such as the color, the importance of a feature element such as the red or green color may also vary. However, the above searching system does not take into consideration the different importance of features or feature elements for each image to be searched.

In another searching method entitled "Virage image search engine" (www.virage.com), a user directly inputs the level of importance for features such as the color, texture and shape by assigning weight values. Although an image may be searched according to an importance of a feature using this method, it may be difficult for a user to determine the weights of features.

Therefore, Yong Rui in "Relevance feedback techniques in interactive" SPIE Vol. 3312, discloses a method in which images similar to a reference image are found and the importance of features or weight for features are automatically obtained by calculating the similarities among the found images. However, the weight importance information is not maintained after a search for a specific image is finished and must be calculated for each image search, even for a same image.

In the image search and browsing system or the video (moving image) search and browsing system of the related art, information which describes a particular feature of an image or video data is utilized to perform a more effective search or browsing of the multimedia data. For example, in the image query system, an image may be divided into a plurality of regions and a representative color of each region may be utilized as a feature information of the image, or a whole color histogram of the image may be utilized as a feature information. Thereafter, two images are compared to calculate a similarity based upon the feature information and a determination is made whether the two images are similar.

Therefore, the image search methods in the related art may utilize weights of features such as color, texture, or shape. However, weights of feature elements are not taken into consideration. Accordingly, the image search methods in related art has the limitations in intellectually training and developing weights for searching, resulting in relatively longer searching period to obtain search results and a deterioration of the reliability of the search results.

SUMMARY OF THE INVENTION

Accordingly, an object of the present invention is to solve at least the problems and disadvantages of the related art.

An object of the present invention is to provide a method of searching multimedia data by automatically updating weights of features included in a specified image and/or weights of feature elements, and by applying the updated weights to search for the specified object.

Another object of the present invention is to provide a method of searching multimedia data which constructs image characteristics corresponding to the types of features included in a specified image by analyzing and classifying the judgement standards applied when the user searches the image, and adjusts the feature information set by taking into consideration weights of the features and weights of feature elements during a following image search.

Still another object of the present invention is to provide a feature structure to be included in a multimedia data to effectively search an image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of searching multimedia data in a multimedia data search system comprises searching for a reference multimedia data selected by a user; receiving user feedback of relevance information for the searched multimedia data; determining importance of respective feature elements of features included in the multimedia data according to the relevance information; re-performing the search for the reference multimedia data by updating the importance of said respective elements if the user requests an additional search; and updating previous importance to new importance obtained and maintaining the updated importance degrees.

In another embodiment of the present invention, a method of searching multimedia data in a multimedia data search system comprises receiving an inquiry into previously searched multimedia data; analyzing a judgement standard for the multimedia data searched during the inquiry; constructing image characteristics using at least one feature included in the multimedia data using an analysis result of the judgement standard; and adjusting importance of the image characteristics and re-performing a search of the multimedia data if a user requests an additional search.

The present invention also provides a feature structure of multimedia data comprising a first information representing a feature of the multimedia data; a second information representing a regional feature of the multimedia data; and a third information representing importance of the first and second information.

BRIEF DESCRIPTION OF THE DRAWINGS

The invention will be described in detail with reference to the following drawings in which like reference numerals refer to like elements wherein:

FIGS. 8 to 11 are different embodiments of the image characteristics.

DETAILED DESCRIPTION OF THE PREFFERRED EMBODIMENTS

Reference will now be made in detail to the preferred embodiments of the present invention, examples of which are illustrated in the accompanying drawings.

Figures 1, 2:
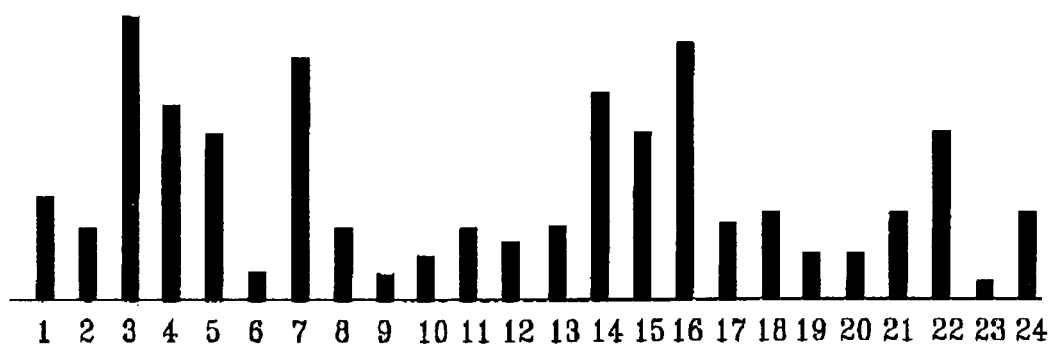
FIG. 1 shows features in an image by a histogram.
FIG. 2 shows an image represented by a local grids.

In a general image search system, features of an image such as color, texture, and shape may be represented by a histogram as shown in FIG. 1. Particularly, FIG. 1 is a color histogram of an image by which the colors in the image is grouped into 24 color elements. By adjusting or altering the weights of each color element, the degree of importance of each color element or the extent that a color element affects a search may be represented.

FIG. 2 is an image represented by local grids. Particularly, an image is divided into n*m grid regions and each grid region may be represented either by a regional color histogram or by a color representing the grid region. Here, the degree of importance of each grid region or the extent that a grid region affects a search may be represented by assigning weights to each of n*m grid regions. Also, a predetermined threshold value determined by the system may be utilized as a cap such that certain grid regions has no influence in the search. Namely, if a grid region has a weight which exceeds the predetermined threshold value, the grid region is utilized in the search. Otherwise, the grid region is processed as a "Don't care" region which does not affect the image search.

The image search process will next be explained with reference to FIGS. 3 to 5.

Figure 3:
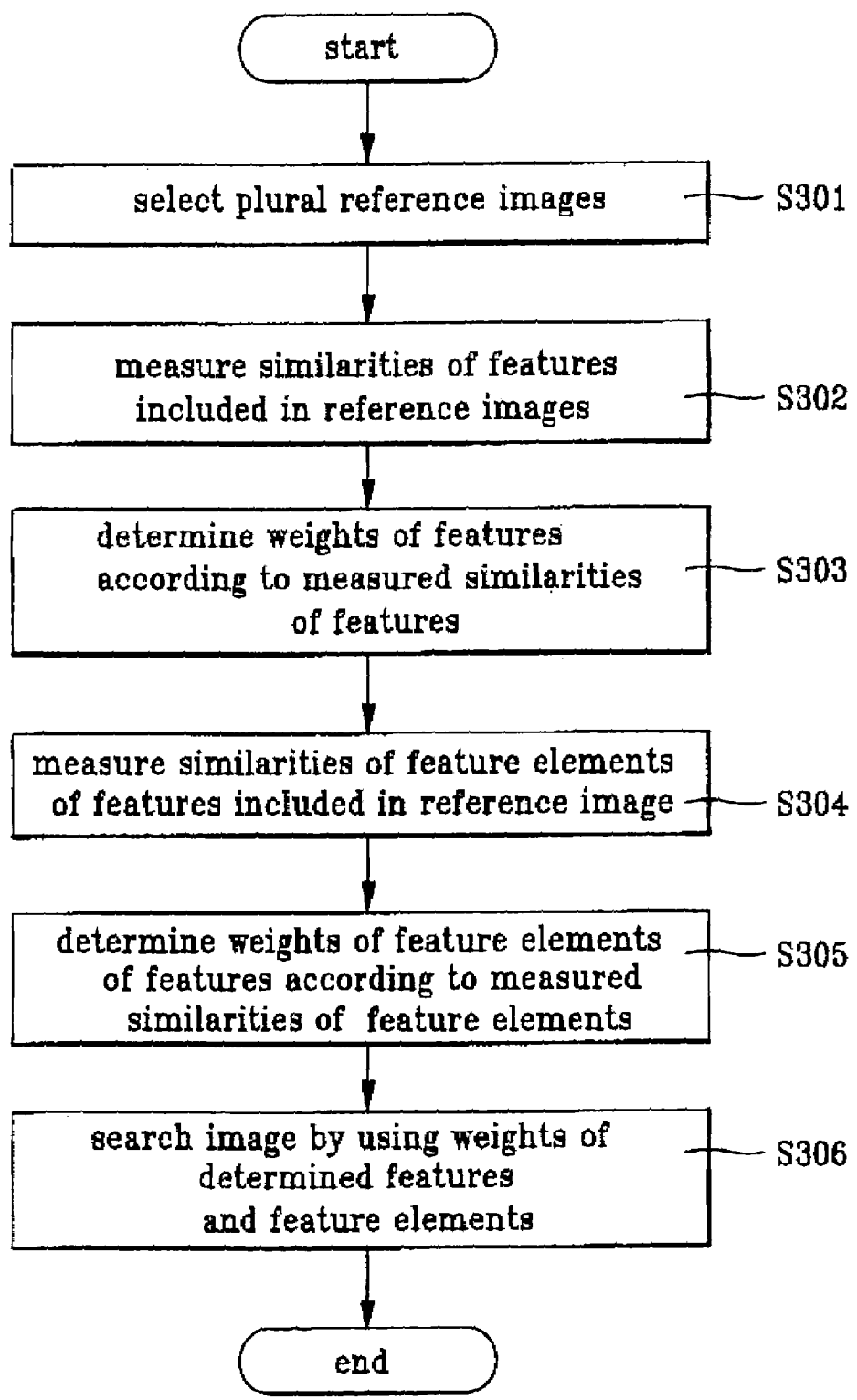
FIG. 3 is a flowchart of a multimedia data search process according to a first embodiment of the present invention.

FIG. 3 is a flowchart of a multimedia data search process when a plurality of reference images are selected and weights of the respective types or elements of features included in a specified image are assigned or updated according to the first embodiment of the present invention. Referring to FIG. 3, a user selects a plurality of reference images (step S301) representing the specified image to be searched. Thereafter, the system judges and determines the importance of the feature elements included in the reference images.

For example, the system measures the similarities of the features included in the reference images (step S302), and determines the weights of each feature according to the measured similarities of the features (step S303). Also, the system measures the similarities of the feature elements in each feature included in the reference images (step S304), and determines the weights of feature elements in each respective feature according to the measured similarities of the feature elements (step S305).

Accordingly, if a user requests an additional search, the system re-performs the image search by using the importance, i.e. the weights of the features and the weights of the feature elements in the respective features (step S306). At this time, the system may use either the weights of the features or the weights of the feature elements, or both.

Particularly, the weights of the features and feature elements of respective features are determined as follows. When the user selects a plurality of the reference images, the search system determines weights of the features and the weights of the feature elements in the respective features by measuring the similarities of features of the selected reference image list and the similarities of the feature elements in the respective features. The weights of the features are calculated by Equations 1a, 1b, and 1c below.

$$\text{Weight\_k} = \frac{Cont(k)}{Cont(\text{ALL})} \quad [1a]$$

$$Cont(k) = \sum_{i=1}^{n-1} \sum_{j=i+1}^{n} Sim(i, j, k) \quad [1b]$$

$$Cont(\text{ALL}) = \sum_{k=1}^{m} Cont(k) \quad [1c]$$

In the above equations, n denotes the reference number, m denotes the number of features used for measuring the similarity, Weight_k denotes the weight of the k-th feature, Simi (i,j,k) denotes the similarity between the I-th reference image and the j-th reference image when the k-th feature is used, and Cont(k) denotes how much the k-th feature contributes to raise the similarity. Generally, the weights of the respective features Weight_k increases as the similarities rises since the similarities among the reference images are calculated based upon the respective features and the feature having the highest similarity acts as the most important factor.

The weights of the feature elements are determined by Equations 2a and 2b using the similarities of the feature elements in the respective features of the reference images.

Weight of element i: $w_i = af_i(i)$ [2a]

Similarlity of element i in reference images [2b]

$$f_i(i) = \frac{pm_i}{qv_i}$$

In the above equations, the values of a, p, and q denote constants, $m_i$ denotes an average of an element i in the reference image list, and $v_i$ denotes the distribution of an element i in the reference image list. According to Equations 2a and 2b, the weight $w_i$ of a feature element is inversely proportional to the distribution of the corresponding feature element and is proportional to an average value of the corresponding feature element component. Therefore, a feature element having a large average value acts as an important factor even if the distribution of the corresponding feature element is wide.

Figure 4:
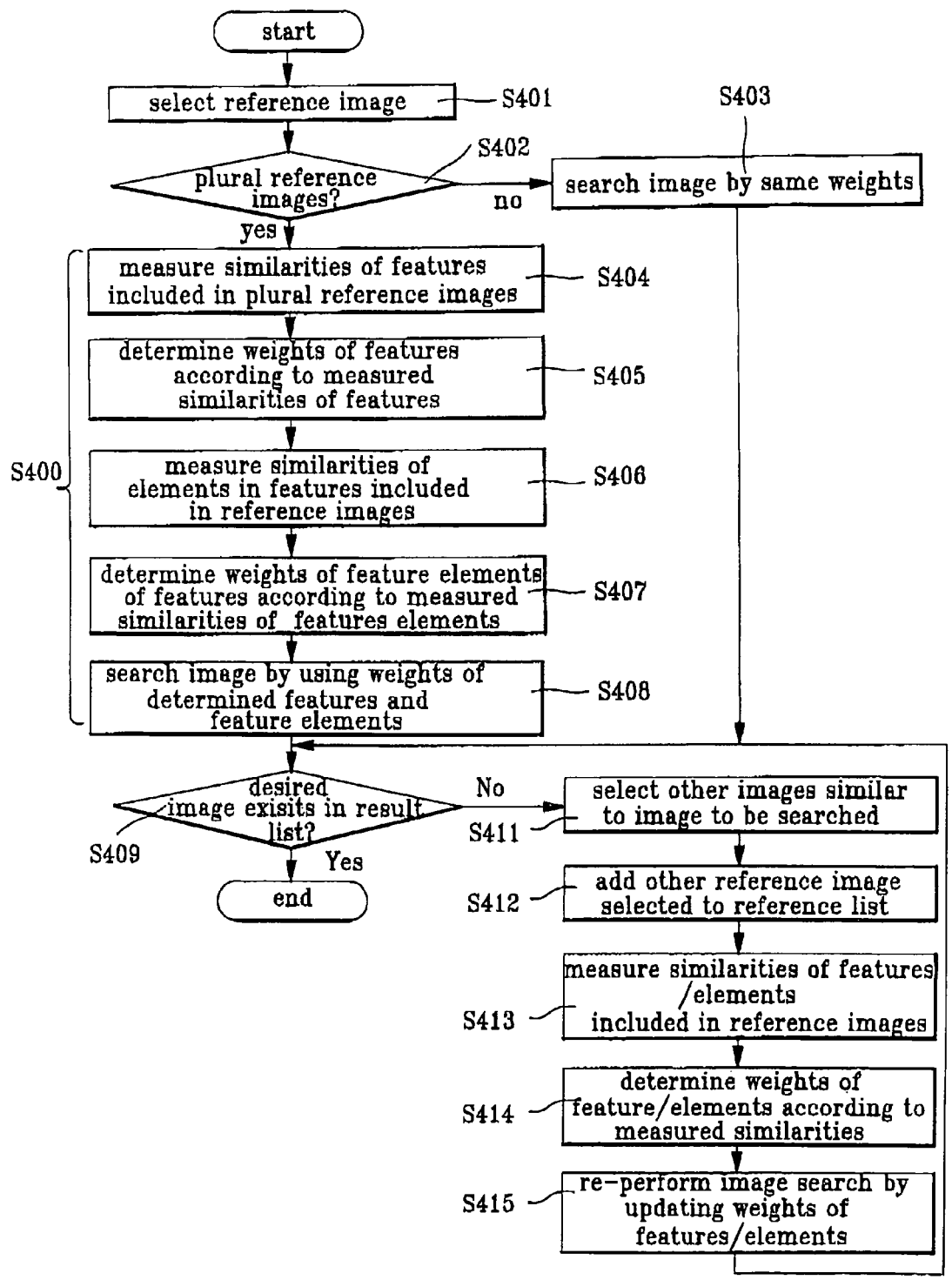
FIGS. 4 and 5 are flowcharts of a multimedia data search process of FIG. 2, where an initial search does not result in a desired image.

FIG. 4 is a flowchart showing a multimedia data search process for when a plurality of reference images are and are not selected. Generally, if the number of reference images is not plural, the image search is performed using features with equivalent weights. However, if the search does not result in a desired image, other reference images similar to the specified image to be searched are selected and added to a reference image list. Then, the weights of the respective features and/or feature elements are updated using the reference image list.

Referring to FIG. 4, when a user selects a plurality of reference images (steps S401 and S402), the process (steps S404~S408) is the same as described with reference to steps S302~S306 of FIG. 3. Thus, an explanation will be omitted. Thereafter, if the user is satisfied with the result of the image search (step S408), the search operation terminates. However, if the user is not satisfied with the search result, the user selects other reference image(s) similar to the specified image to be searched among the resultant images of the search (step S411). On the other hand, when a user selects only one reference image, the image search is performed using features with weights as assigned (step S403). Generally, if the reference image is selected for the first time, the search is performed using features with equal weights assigned. If the user is not satisfied with the search result, the user selects other reference image(s) similar to the specified image to be searched among the resultant images of the search (step S411).

Accordingly, the system adds the selected other reference image(s) to an initial reference image list managed by the system (step S412). Here, the initial reference image list includes the reference image(s) selected in step S401. Thereafter, the system measures the similarities of the respective features and/or feature elements in the selected reference images (step S413), and determines the weights of the respective features and/or feature elements in the selected reference image by Equations 1a~1c, 2a and 2b (step S414). Thus, the system updates the weights of the respective features and/or feature elements, and re-performs the image search utilizing the updated weights (step S415).

Figure 5:
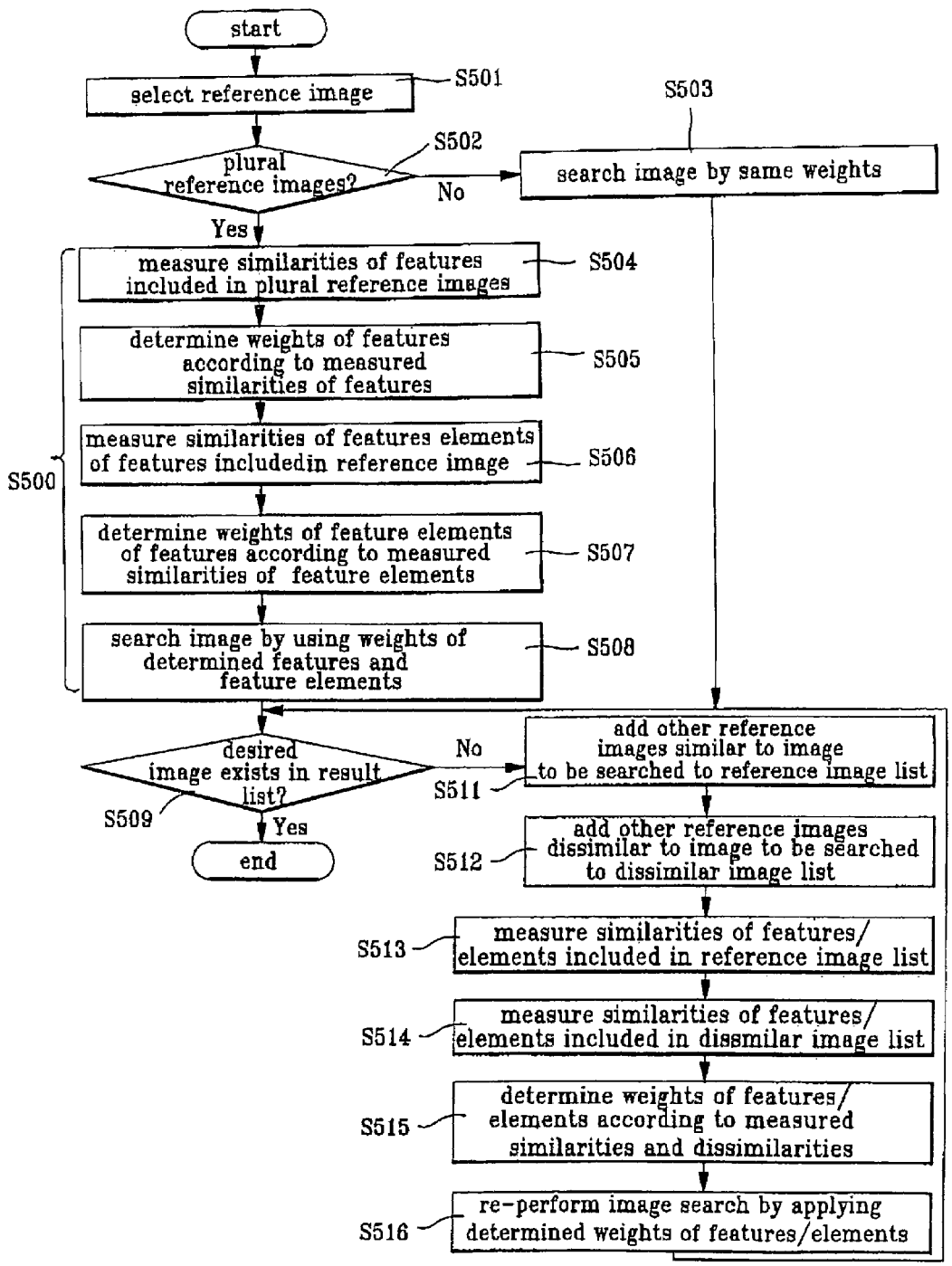

FIG. 5 is a flowchart showing another multimedia data search process for when a plurality of reference images are and are not selected. Generally, if the number of reference images is not plural, the image search is performed using features with equivalent weights. However, if the search does not result in a desired image, other reference images, both similar and dissimilar to the specified image to be searched are selected and respectively added to a reference image list or a dissimilar image list. Then, the weights of the respective features and/or feature elements are updated using the reference image list and the dissimilar image list.

Referring to FIG. 5, when a user selects a plurality of reference images (steps S501 and S502), the process (steps S504~S508) is same as described with reference to steps S302~S306 of FIG. 3. Thus, an explanation will be omitted. Thereafter, if the user is satisfied with the result of the image search (step S509), the search operation terminates. However, if the user is not satisfied with the search result, the user selects other reference image(s) similar and dissimilar to the specified image to be searched among the resultant images of the search. On the other hand, when a user selects only one reference image, the image search is performed using features with weights as assigned (step S503). Here, if the reference image is selected for the first time, the search is performed using features with equal weights assigned. If the user is not satisfied with the search result, the user then selects other reference image(s) similar and dissimilar to the specified image to be searched among the resultant images of the search.

Accordingly, the system adds the selected similar image(s) to an initial reference image list managed by the system (step S511) and adds the dissimilar image(s) to an initial dissimilar image list (step S512). Here, the initial reference image list includes the reference image(s) selected in step S501. Thereafter, the system measures the similarities of the respective features and/or feature elements in the images included in the reference image list (step S513), and measures the similarities of the respective features and/or feature elements in the images included in the dissimilar image list (step S514).

Using Equations 1a~1c, 2a and 2b, the system determines the weights of the respective features and/or feature elements using the images included in the reference image list and the dissimilar image list (step S515). Thus, the system updates the weights of the respective features and/or feature elements, and re-performs the image search utilizing the updated weights (step S516). Particularly, the weights of the features by the similarity measurement of the features and/or feature elements in the images included in the reference/dissimilar image lists are calculated by Equations 3a~3d.

$$\text{Weight\_k} = (a \times \text{Weight}_{I\_k}) \times \left( \frac{b}{\text{Weight}_{R\_k}} \right) \quad [3a]$$

$$\text{Weight}_{R\_k} = (\text{Weight}_{I\_k}) = \frac{\text{Cont}(k)}{\text{Cont}(\text{ALL})} \quad [3b]$$

$$\text{Cont}(k) = \sum_{i=1}^{n-1} \sum_{j=i+1}^{n} \text{Sim}(i, j, k) \quad [3c]$$

$$\text{Cont}(\text{ALL}) = \sum_{k=1}^{m} \text{Cont}(k) \quad [3d]$$

In the above equations, n denotes the reference number in the reference image list or the dissimilar image list, m denotes the number of features used for the similarity measurement, Weight_k denotes the final weight of the k-th feature, Simi(i,j,k) denotes the similarity between the I-th reference image and the j-th reference image when the k-th feature is used, Cont(k) denotes how much the k-th feature contribute to raise the similarity, $\text{Weight}_{I\_k}$ denotes the weight of the k-th feature in the reference image list, and $\text{Weight}_{R\_k}$ denotes the weight of the k-th feature in the dissimilar image list. Generally, the similarities of the images included in the reference image list and the dissimilar image list are calculated respectively. As a result, the weights of the respective features Weight_k increase as the similarities of the images included in the reference image list rises, while the weights decrease as the similarities in the images included in the dissimilar image list rises.

Also, after measuring the similarities of the feature elements in the respective features of the images included in the reference/dissimilar image list, the weights of the feature elements of the respective features are determined by Equations 4a~4b.

Weight of an element i: $w_i = a f_I(i) + b f_R(i)$ [4a]

Similarity of an element i in the reference images: [4b]

$$f_i(i) = \frac{p m_i}{q v_i}$$

In the above equations, $f_R(I) = pm_i \times v_i$ denotes the dissimilarity of an element i in the images included in the dissimilar image list, the values of a, b, p, and q denote constants, $m_i$ denotes an average of the element i in the images included in the corresponding (reference and dissimilar) image lists, and $v_i$ denotes the distribution of the element i in the images included in the corresponding (reference and dissimilar) image lists. Generally, the similarities of the images included in the reference image list and the dissimilar image list are calculated respectively. As a result, the weights of the respective feature elements Weight_k increase as the similarities of the images included in the reference image list rises, while the weights decrease as the similarities in the images included in the dissimilar image list rises.

If the weights of the features and the weights of the feature elements are determined as above, the similarities will be calculated using Equation 5 during the image search.

$$A - \sum_{k=0}^{n} W_k \sum_{i=0}^{km} w_{k\_i} Diff(F_{k\_i}, p, q)$$ [5]

Here, A is a constant, $Diff(F_{k\_i}, p, q)$ denotes the difference between the I-th elements of the k-th feature of the image p and image q, $w_{R\_I}$ denotes the weight of the I-th feature element of the k-th feature, $w_k$ denotes the weight of the k-th feature, n denotes the number of features, and km denotes the number of feature elements of the k-th feature. Thus, the difference is obtained by multiplying the feature difference value of the respective image, the feature element weight of the respective feature, and the weight of the respective feature. Also, the similarity is obtained by subtracting the difference from the constant.

As described above in reference to FIGS. 3~5, the system automatically determines and updates both the feature element weights of respective features and the weights of the features of the image to be searched when the user searches an image. Therefore, a rapid and effective search can be performed.

Nevertheless, if the user wishes to perform a further search of the specified image after viewing a previously searched result, the user may raise and enter various kinds of queries to the search system. Table 1 shows examples of queries by users, and Table 2 shows the feature information required according to the type of query when colors and textures are used as the basic features of an image.

TABLE 1

| Query Type |
| --- |
| 1 What color does image have as a whole? |
| 2 Does any portion of the image have a certain color feature? |

TABLE 1-continued

| Query Type |
| --- |
| 3 About what degree does the portion of the image have a certain color feature? |
| 4 What texture does the image as a whole? |
| 5 Does any portion of the image have a certain texture feature? |
| 6 About what degree does the portion of the image have a certain texture feature? |
| 7 Does the image have a certain color and texture feature or have any portion having such features? |
| 8 Does any portion of the image have a certain color and texture feature? |
| 9 About what degree does the portion of the image have a certain color and texture feature? |
| 10 What color does the image have at a specified position? |
| 11 What texture does the image have at a specified position? |
| 12 What color and texture does the image have at a specified position? |

TABLE 2

| Query Type | Main Feature Type |
| --- | --- |
| 1 What color does image have as a whole? | Global color information |
| 2 Does any portion have a certain color feature? | Local color information |
| 3 What degree does the portion have a certain color feature? | Local color information |
| 4 What texture does the image as a whole? | Global texture formation |
| 5 Does any portion have a certain texture feature? | Local texture information |
| 6 What degree does the portion have a certain texture feature? | Local texture information |
| 7 Does the image have a certain color and texture feature or have any portion having such features? | Global color texture information |
| 8 Does any portion have a certain color and texture feature? | Local color texture information |
| 9 What degree does the portion have a certain color and texture feature? | local color texture information |
| 10 What color does the image have at a specified position? | Local color position information |
| 11 What texture does the image have at a specified position? | local texture position information |
| 12 What color and texture does the image have at a specified position? | local color texture position information |

In Table 2, 12 query types are presented and to satisfy the characteristics with respect to such queries, the search system should have at least the following 8 image feature information.

The first image feature information is a global color information which represents the color feature of the whole image. A color histogram may be an example of the global color information. The second image feature information is a global texture information which represents the texture feature of the whole image. A texture histogram may be an example of the global texture information. The feature information of the color and the texture of the whole image may be represented by a combination of the global color information and the global texture information.

The third image feature information is a local color information which represents the color feature of a region, i.e. grid region, in the image. A representative color for each local grid may be an example of the local color information. Alternatively, the weights of color elements obtained from the global color information may be utilized as the local color information.

The fourth image feature element is a local texture information representing the texture feature of a grid region in the image. A representative texture for each grid may be an example of the local texture information. Alternatively, the weights of texture elements obtained from the global texture information may be utilized as the local texture information.

The fifth image feature element is a local color and texture information which represents the color and texture features of a grid region in the image. A representative color and texture for each grid may be an example of the local color and texture information. Alternatively, the weights of color and texture elements respectively obtained from the global color information and the global texture information may be utilized as the local color and texture information.

The sixth image feature element is a local color position information which represents a color feature in a region at a particular position of the image. A color local grid feature may be an example of the local color position information. The seventh image feature element is a local texture position information which represents a texture feature in a region at a particular position of the image. A texture local grid feature may be an example of the local texture position information. Also, the specified color and texture feature in a region at the particular position of the image can be represented as a combination of the sixth and seventh information.

The eighth image feature information is a local color and texture information which represents a specified color and texture feature in a region at a particular position of the image. A color and texture local grid feature may be an example of the local color and texture position information.

The system can perform an effective search by constructing a set of feature information, i.e. image characteristics, as described above using the analyzed results based upon the contents of the queries and add element weights to the constructed features. Thus, if a user requests a search, the system adjusts the importance of the image characteristics, i.e. the weights of the features and/or feature element, and performs the image search.

The search method using a reference multimedia data determines a multimedia data having the highest similarity to the reference multimedia data by adjusting the weights of the features and/or feature elements of the respective features included in the multimedia data. Here, the weight adjustment of the feature and/or feature elements of the respective features can be performed using one of a direct adjusting method by the user, an automatic adjusting method by the system, or an adjusting method using the relevance information (i.e., positive and negative information) fed back to the system by the user. The meanings of the features as described above will now be explained in detail.

First, a color histogram represents the color distribution in an image. Similarly, the texture histogram represents the texture distribution in an image.

The color image grid represents the color information of a grid region generated by dividing an image into n*m grid regions. The texture image grid represents the texture information of a grid region generated by dividing an image into n*m grid regions. The color-texture joint local grid represents the color texture information of a grid region generated by dividing an image into n*m grid regions.

Figure 6:
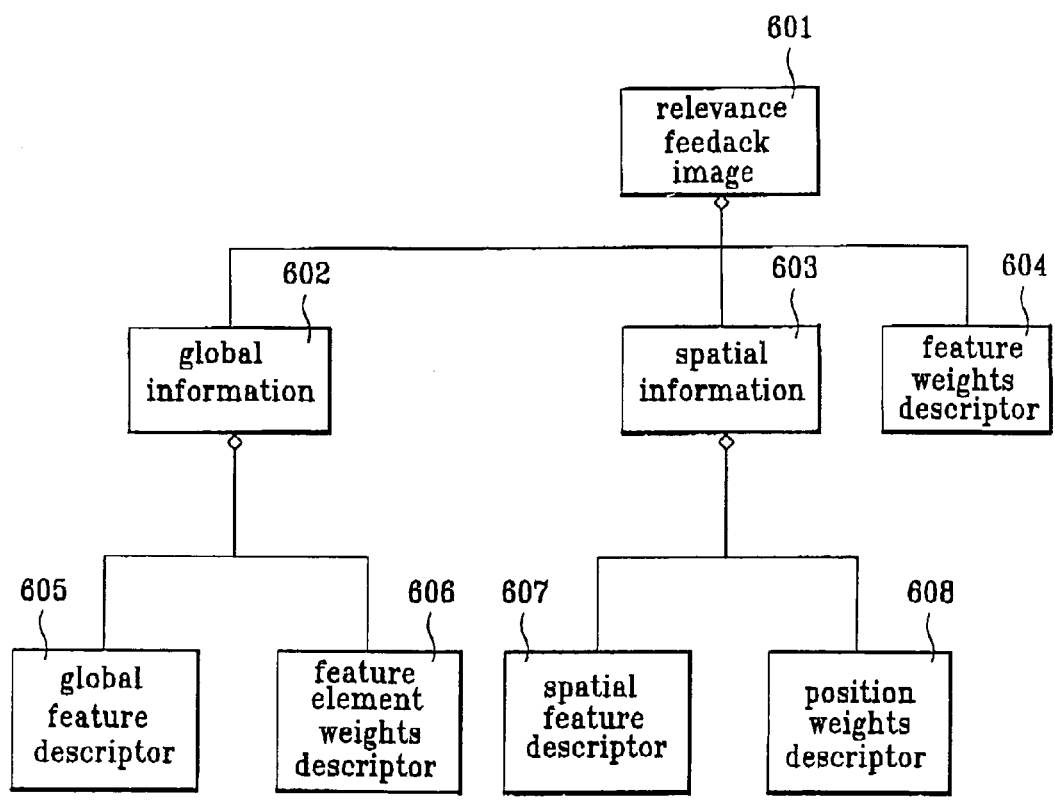
FIG. 6 is a basic structure of image characteristics for an image search according to a second embodiment of the present invention.

FIG. 6 shows the structure of texture description which can be constructed in consideration of the query types and relevance feedbacks of the user 601. The structure comprises comprises a global information 602 which represents a feature of a whole image, a spatial information 603 which represents a feature of an image region, and weight information 604 which represents the importance of the constructed features 602 and 603. The global information includes a global feature descriptor 605 of the whole image, and an element weight descriptor 606 of the feature elements of the global feature descriptor of the whole image. The spatial information 603 includes a spatial feature descriptor 607 of an image region, and a position weight descriptor 608 of the image region.

The global information 602 of the whole image and the spatial information 603 of the image region can be constructed by a selective combination of features included in the image such as the color, texture, and shape. Here, the possible combinations of the basic features can be obtained using Equation 6 below, where n denotes the number of the basic features.

$$\sum_{k=1}^{n} nCk \qquad [6]$$

Thus, the number of feature types obtained by Equation 6 applies to local positions and for global information, since there n number of basic features, the total number of feature types can be obtained by Equation 7.

$$\sum_{k=1}^{n} nCk + 2n. \qquad [7]$$

The present invention will be explained utilizing two basic features of color and texture. In such case, the total number of feature types required by the system would be 3+2*2=7. However, if the feature of shape is added, the total number of required feature type would be 7+2*3=13.

Figure 7:
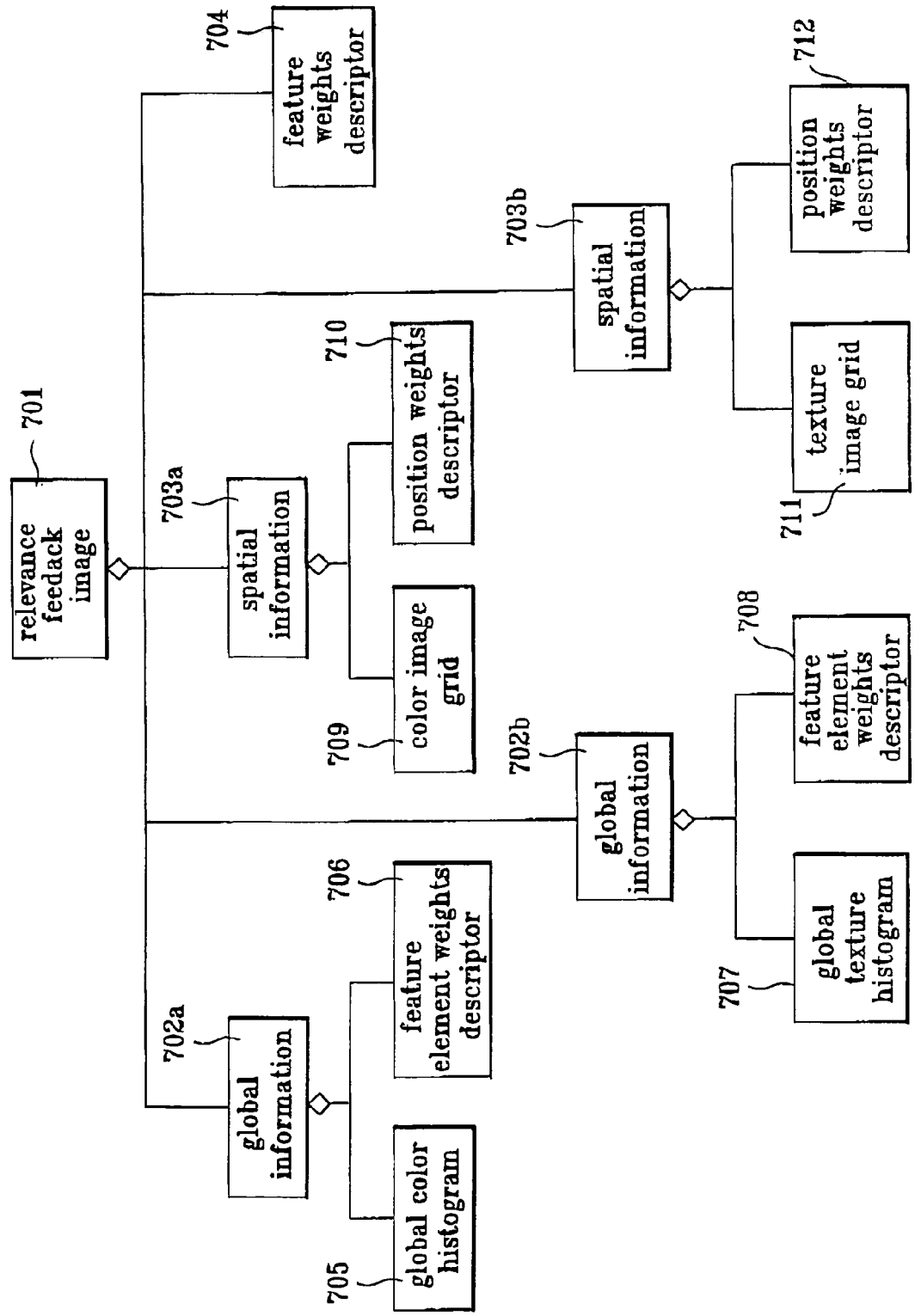
FIG. 7 is image characteristics of FIG. 6 wherein the feature information is constructed using a color and texture.

FIG. 7 shows image characteristics constructed using the features of color and texture. Referring to FIG. 7, the relevance feedback image(s) 701 used for adjusting the weights of the image is features according to the user feedback includes global color information 702a of the whole image, global texture information 702b of the whole image, spatial information 703a of image regions, spatial color information 703b of image regions, and weight descriptor 704 of the global informations 702a and 702b, and of the spatial informations 703a and 703b.

In FIG. 7, four feature informations 702a, 702b, 703a and 703b are used, requiring four weights. Particularly, the global color information 702a includes a global color histogram 705 representing the color feature information of the whole image, and an element weight descriptor 706 of the respective bins of the global color histogram. The global texture information 702b includes a global texture histogram 707 representing the texture information of the whole image, and an element weight descriptor 708 of the respective bins of the global texture histogram.

Also, the spatial color information 703a includes a color image grid 709, and a position weight descriptor 710 of the color image grid. The spatial texture information 703b includes a texture image grid 711, and a position weight descriptor 712 of the texture image grid.

The color histogram 705 is used as a feature information of the whole image and the weight of each color element in the color histogram 705 are represented by the element weight descriptor 706. Also, the global texture histogram 707 is used as another feature information of the whole image and the weight of each texture element in the global texture histogram 707 are represented by the element weight descriptor 708.

Moreover, the color image grid 709 is used as a feature information of the image regions and the weight of each grid position in the color image grid 709 is represented by the position weight descriptor 710. Similarly, the texture image grid 711 is used as another feature information of the image regions, and the weight of each grid position in the texture image grid 711 is represented by the position weight descriptor 712.

As shown in FIG. 7, an image characteristic structure having four feature information was explained in order to satisfy the twelve query types in Table 2. However, all nine feature types for the twelve query types is not necessary. For example, if a color-texture joint local grid is used as a feature, the local color, local texture, local color and texture, local position color, local position texture and local position color and texture can be obtained from the color-texture joint local grid.

Figure 8:
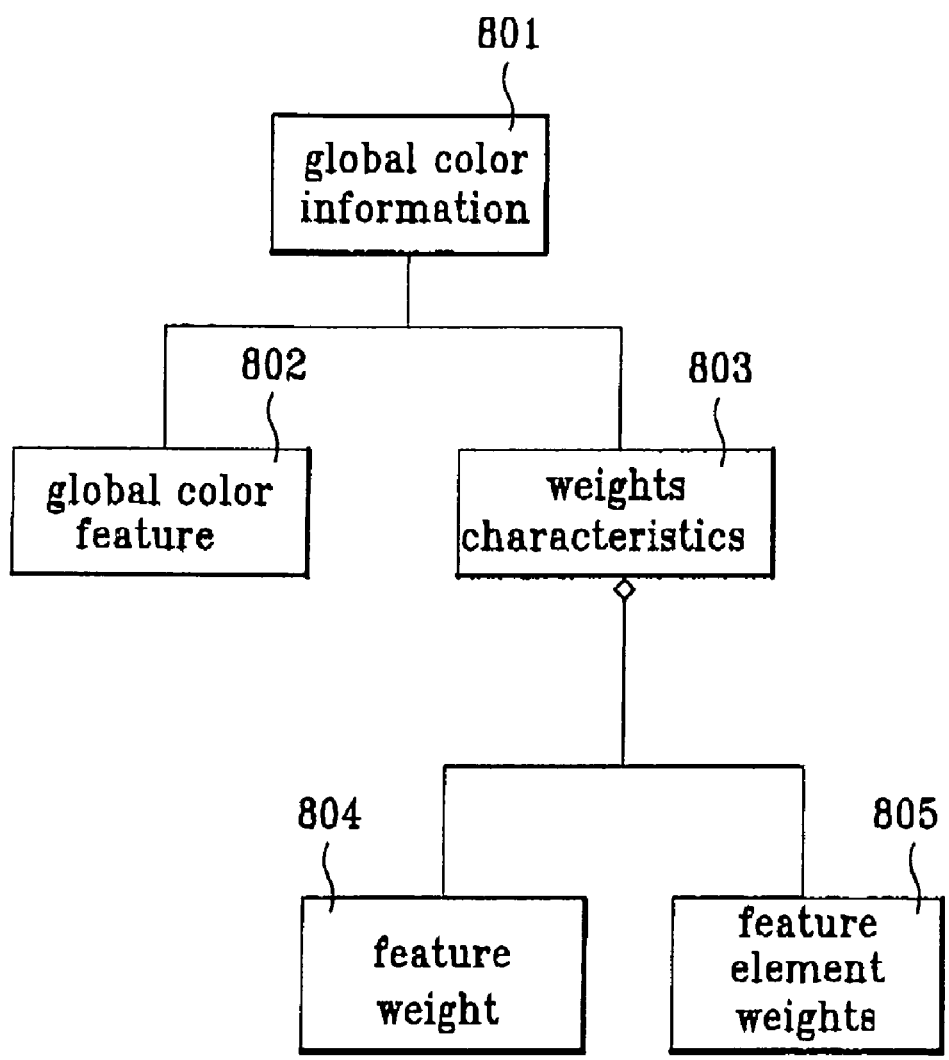

Furthermore, in the image characteristic structure of FIG. 7, the feature weights are represented the same level as the feature information, and the feature element weights are represented in a level below the respective feature information. However, image characteristics may be constructed alternatively with the feature weights in a level below the respective feature information as shown in FIG. 8. For example, assuming that a global color information 801 is the feature information, the global color information 801 includes a global color feature 802, and weights 803. Here the weights 803 is composed of feature weights 804 corresponding to the global color feature and feature element weights 805.

Figure 9:
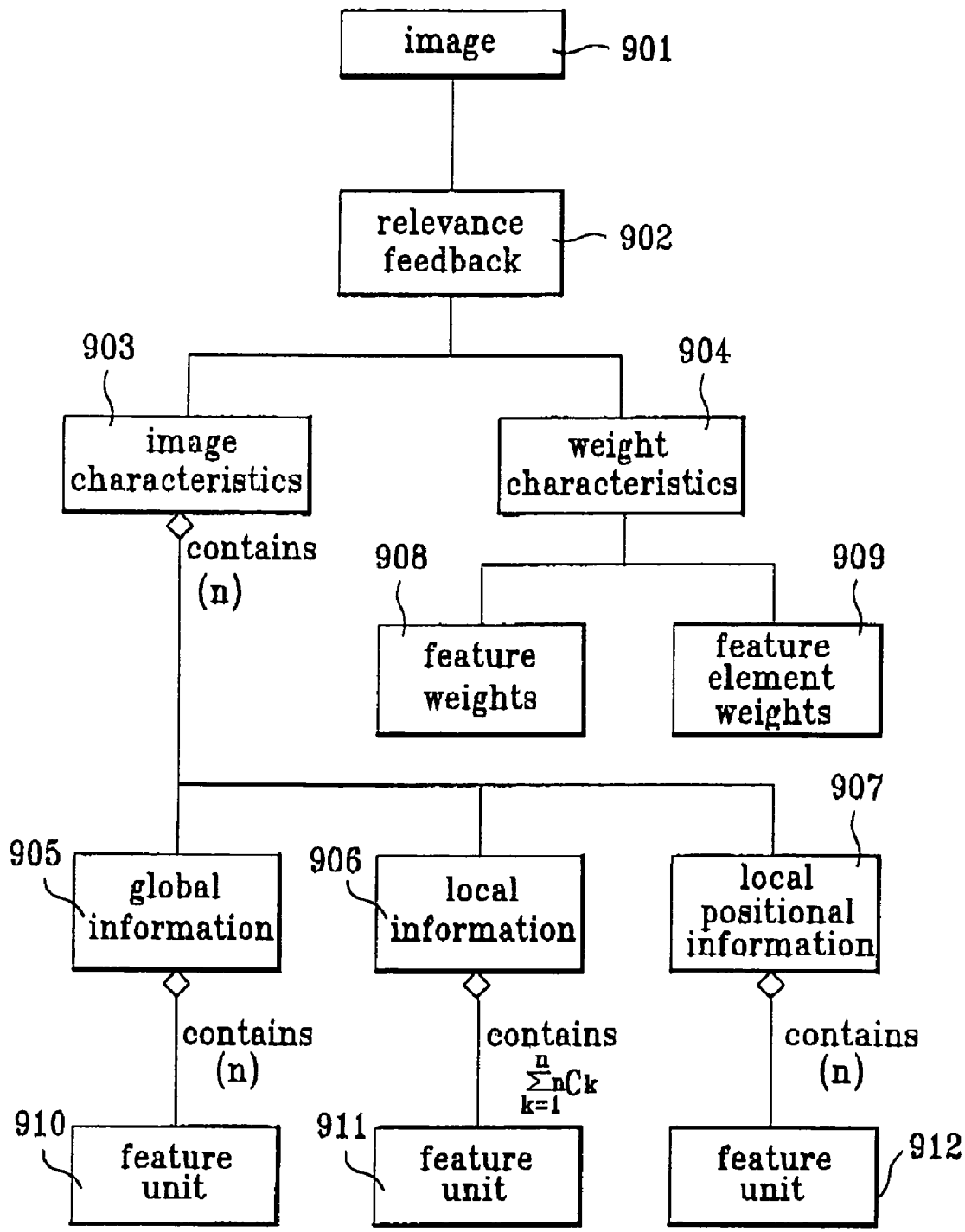

FIG. 9 shows another embodiment of the image characteristics used for adjusting the weights of the image features according to the user feedback. In this image characteristic, all information related to weight characteristics are grouped into a set and represented separately.

Referring to FIG. 9, the image feature structure 902, i.e. the reference feedback, for adjusting the weights of the image features when searching the image 901 includes image characteristics 903 and the weight characteristics 904. The image characteristics 903 include global information 905, local information 906, and local position information 907. The weight characteristics 904 include feature weights 908 and feature element weights 909. Moreover, the global information 905 includes n feature units 910, the local information 906 includes a number of feature units 911 equivalent to a sum of the number of features and possible combinations of the features, and the local position information 907 also includes n feature units.

Figure 10:
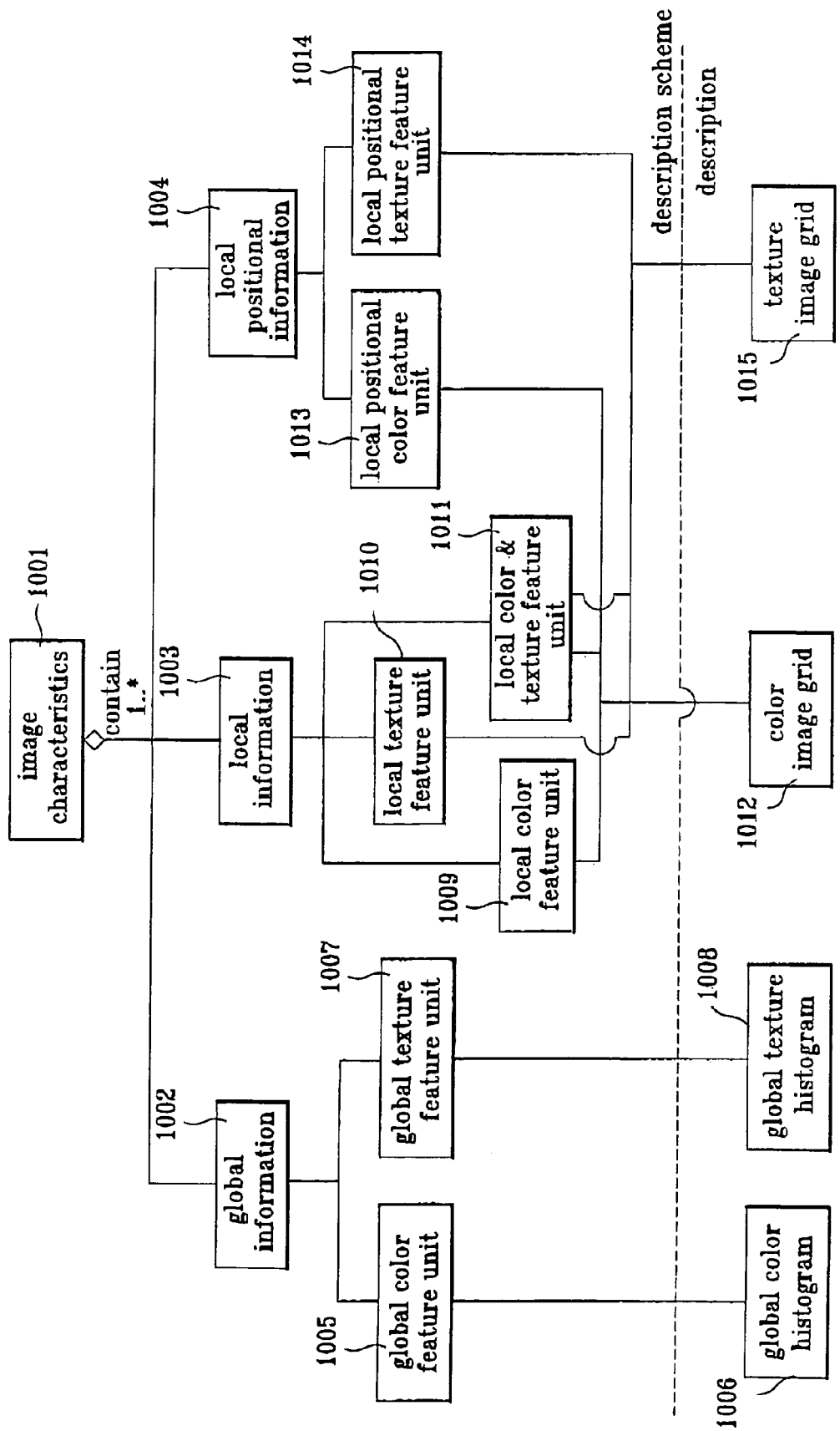

FIG. 10 shows another example of the image data structure of FIG. 9 when the image information includes two basic features of color and texture. Particularly, the image characteristics 1001 includes global information 1002, local information 1003 and local positional information 1004. The global information 1002 includes a global color feature unit 1005 and a global texture feature unit 1001. The local information 1003 includes a local color feature unit 1009, a local texture feature unit 1010 and a local color and texture feature unit 1011. The local position information 1004 includes a local position color feature unit 1013 and a local position texture feature unit 1014.

Moreover, the global color feature unit 1005 is represented by a global color histogram 1006, the global texture feature unit 1007 is represented by a global texture histogram 1008, and the local color feature unit 1009 and the local position color feature unit 1013 are represented by a color image grid 1012. Also, the local texture feature unit 1010 and the local position texture feature unit 1014 are represented by a texture image grid 1015. Finally, the local color and texture feature unit 1011 is represented by both the color image grid 1012 and the texture image grid 1015.

Therefore, the query types in Table 2 can be satisfied by constructing image characteristics of the seven features as described above, and the weights are updated by adjusting the weights in the feature weights and the feature element weights as shown in FIG. 11. Referring to FIG. 11, the image feature structure 1102, i.e. the reference feedback, for adjusting the weights of the image features when searching the image 1101 includes image characteristics 1103 and weight characteristics 1104.

Particularly, the image characteristics 1103 includes global information 1105, local information 1106 and local positional information 1107. The weight characteristics 1104 includes feature weights 1108 and feature element weights 1109. Here, the global information 1105 includes a global color feature unit 1110 and a global texture feature unit 1111. The local information 1106 includes a local color feature unit 1112, a local texture feature unit 1113 and a local color and texture feature unit 1114. The local position information 1107 includes a local position color feature unit 1115 and a local position texture feature unit 1116.

As described above, according to the present invention, the system analyzes all possible queries of the user, and provides minimum image characteristics which satisfy all judgement standards during the image search. Accordingly, a rapid and effective image search can be performed by adjusting the weights of the features and feature elements to reflect the user feedbacks.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of searching multimedia data comprising:
   receiving at least one reference multimedia data selected by a user, wherein the reference multimedia data represents a specified multimedia data to be searched;
   measuring the similarities of features included in the plurality of reference multimedia data;
   determining and updating weights of each feature according to the measured similarities of the features;
   measuring the similarities of the feature elements in each feature included in the plurality of reference multimedia data;
   determining weights of each feature elements in respective features according to the measured similarities of the feature elements; and
   searching for the specified multimedia data utilizing features and feature elements included in the plurality of reference multimedia data, in consideration of the updated weights of features and feature elements.

2. A method of claim 1, wherein in searching for the specified multimedia data utilizing a combination of features and feature elements of the respective features included in said at least one reference multimedia data, wherein each feature has a feature weight and each feature element has a feature element weight.

3. A method of claim 2, wherein one reference multimedia data is selected by the user, and comprising searching for the specified multimedia data utilizing features and feature elements of the respective features included in said reference multimedia data, wherein each features has a feature weight and each feature element has a feature element weight.

4. A method of claim 3, further comprising terminating the search if the user is satisfied with the result of the search, otherwise the method comprising:
- receiving at least one other reference multimedia data selected from among the resultant images of the search, wherein said at least one other reference multimedia data is determined to be similar to the specified multimedia data;
- measuring the similarities of features included in said reference multimedia data and said at least one other reference multimedia data;
- determining and updating weights of each feature according to the measured similarities of the features;
- measuring the dissimilarities of the feature elements in each feature included in said reference multimedia data and said at least one other reference multimedia data;
- determining and updating weights of each feature elements in respective features according to the measured similarities of the feature elements; and
- re-searching for the specified multimedia data utilizing features and feature elements included in said reference multimedia data and in said at least one other reference multimedia data, in consideration of the updated features weights and feature element weights.

5. A method of claim 4, further comprising:
- receiving at least one dissimilar multimedia data selected from among the resultant images of the search, wherein said at least one dissimilar multimedia data is determined to be dissimilar to the specified multimedia data;
- measuring the dissimilarities of features included in said reference multimedia data and said at least one dissimilar multimedia data;
- measuring the dissimilarities of the feature elements in each feature included in said reference multimedia data and said at least one dissimilar multimedia data; and
- wherein determining and updating weights of each feature elements in respective features according to the measured dissimilarities of the feature elements;
- wherein determining and updating weights of each feature elements in respective features according to the measured dissimilarities of the feature elements; and
- wherein re-searching for the specified multimedia data utilizing features and feature elements included in said reference multimedia data, in said at least one other reference multimedia data and in said at least one dissimilar data, in consideration of the updated features weights and feature element weights.

6. A method of claim 3, further comprising terminating the search if the user is satisfied with the result of the search, otherwise the method comprising:
- receiving at least one dissimilar data multimedia data selected from among the resultant images of the search, wherein said at least one dissimilar data multimedia data is determined to be dissimilar to the specified multimedia data;
- measuring the dissimilarities of features included in said reference multimedia data and said at least one dissimilar data multimedia data;
- determining and updating weights of each feature according to the measured dissimilarities of the features;
- measuring the dissimilarities of the feature elements in each feature included in said reference multimedia data and said at least one dissimilar data multimedia data;
- determining and updating weights of each feature elements in respective features according to the measured dissimilarities of the feature elements; and
- re-searching for the specified multimedia data utilizing features and feature elements included in the plurality of reference multimedia data and in said at least one dissimilar data multimedia, in consideration of the updated features weights and feature element weights.

7. A method of claim 2, wherein the feature is a color and the feature element weights are determined either by a color histogram with n color elements as the feature elements, or by dividing a multimedia data into n*m grid regions and utilizing a regional color histogram or a color representing a grid region as the feature elements.

8. A method of claim 1, further comprising terminating the search if the user is satisfied with the result of the search, otherwise the method comprising:
- receiving at least one other reference multimedia data selected from among the resultant images of the search, wherein said at least one other reference multimedia data is determined to be similar to the specified multimedia data;
- measuring the similarities of features included in the plurality of reference multimedia data and said at least one other reference multimedia data;
- determining and updating weights of each feature according to the measured similarities of the features;
- measuring the similarities of the feature elements in each feature included in the plurality of reference multimedia data and said at least one other reference multimedia data;
- determining and updating weights of each feature elements in respective features according to the measured similarities of the feature elements; and
- re-searching for the specified multimedia data utilizing features and feature elements included in the plurality of reference multimedia data and in said at least one other reference multimedia data, in consideration of the updated features weights and feature elements weights.

9. A method of claim 8, further comprising:
- receiving at least one dissimilar multimedia data selected from among the resultant images of the search, wherein said at least one dissimilar multimedia data is determined to be dissimilar to the specified multimedia data;
- measuring the dissimilarities of features included in the plurality of reference multimedia data and said at least one dissimilar multimedia data;
- measuring the dissimilarities of the feature elements in each feature included in the plurality of reference multimedia data and said at least one dissimilar multimedia data; and
- wherein in determining and updating weights of each feature elements in respective features according to the measured dissimilarities of the features according to the measured dissimilarities of the feature elements;
- wherein in determining and updating weights of each feature elements in respective features according to the measured dissimilarities of the feature elements; and
- wherein in re-searching for the specified multimedia data utilizing features and feature elements included in the plurality of reference multimedia data, in said at least one other reference multimedia data and in said at least one dissimilar data, in consideration of the updated features weights and feature elements weights.

10. A method of claim 1, further comprising terminating the search if the user is satisfied with the result of the search, otherwise the method comprising:

receiving at least one dissimilar data multimedia data selected from among the resultant images of the search, wherein said at least one dissimilar data multimedia data is determined to be dissimilar to the specified multimedia data;

measuring the dissimilarities of features included in the plurality of reference multimedia data and said at least one dissimilar data multimedia data;

determining and updating weights of each feature according to the measured dissimilarities of the features;

measuring the dissimilarities of the feature elements in each feature included in the plurality of reference multimedia data and said at least one dissimilar data multimedia data;

determining and updating weights of each feature elements in respective features according to the measured dissimilarities of the feature elements; and re-searching for the specified multimedia data utilizing features and feature elements included in the plurality of reference multimedia data and in said at least one dissimilar data multimedia data, in consideration of the updated features weights and feature element weights.

11. A method comprising:

searching for a target image based on search criteria, wherein searching for the target image comprises:

inputting a first image that is similar to the target image;

inputting a second image that is dissimilar to the target image; and correlating the first image and the second image to construct the search criteria.

12. The method of claim 11, wherein the correlating comprises:

identifying a feature that is common between the first image and the second image; and decreasing the weight of the identified feature in the search criteria.

13. The method of claim 11, wherein the correlating comprises:

identifying a feature that is not common between the first image and the second image; and increasing the weight of the identified feature in the search criteria.

14. An apparatus configured to:

search for a target image based on search criteria, wherein searching for the target image comprises:

inputting a first image that is similar to the target image;

inputting a second image that is dissimilar to the target image; and correlating the first image and the second image to construct the search criteria.

15. The apparatus of claim 14, wherein the correlating comprises:

identifying a feature that is common between the first image and the second image; and decreasing the weight of the identified feature in the search criteria.

16. The apparatus of claim 14, wherein the correlating comprises:

identifying a feature that is not common between the first image and the second image; and increasing the weight of the identified feature in the search criteria.

* * * * *